United States Patent
Pollard et al.

(10) Patent No.: US 9,361,514 B2
(45) Date of Patent: *Jun. 7, 2016

(54) FORENSIC VERIFICATION FROM HALFTONE IMAGES

(75) Inventors: Stephen Pollard, Dursley (GB); Robert Alan Ulichney, Stow, MA (US); Matthew D Gaubatz, Seattle, WA (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,351

(22) PCT Filed: Feb. 9, 2012

(86) PCT No.: PCT/US2012/024453
§ 371 (c)(1),
(2), (4) Date: Mar. 26, 2014

(87) PCT Pub. No.: WO2013/119235
PCT Pub. Date: Aug. 15, 2013

(65) Prior Publication Data
US 2014/0348395 A1    Nov. 27, 2014

(51) Int. Cl.
*G06K 9/00* (2006.01)
*H04N 1/405* (2006.01)
*H04N 1/32* (2006.01)

(52) U.S. Cl.
CPC ........ *G06K 9/00442* (2013.01); *H04N 1/32144* (2013.01); *H04N 1/405* (2013.01); *G06T 2207/30144* (2013.01); *H04N 2201/323* (2013.01); *H04N 2201/3235* (2013.01)

(58) Field of Classification Search
None
See application file for complete search history.

(56) References Cited

U.S. PATENT DOCUMENTS

| | | | |
|---|---|---|---|
| 6,219,462 B1 | 4/2001 | Anandan | |
| 6,307,955 B1 | 10/2001 | Zank et al. | |
| 7,394,573 B1 * | 7/2008 | Goldberg et al. | ............ 358/3.28 |
| 7,656,559 B2 | 2/2010 | Goldberg et al. | |
| 8,014,035 B2 | 9/2011 | Monga et al. | |
| 2002/0099943 A1 | 7/2002 | Rodriguez | |
| 2003/0197878 A1 | 10/2003 | Metois | |

(Continued)

FOREIGN PATENT DOCUMENTS

| | | |
|---|---|---|
| JP | 2004511938 A | 4/2004 |
| KR | 20080074496 A | 8/2008 |
| WO | WO-0231752 A1 | 4/2002 |

OTHER PUBLICATIONS

Bulan, O et al "Data Embedding in Hardcopy Images via Halftone-dot Orientation Modulation", Mar. 18, 2008.

(Continued)

*Primary Examiner* — Stephen R Koziol
*Assistant Examiner* — Amandeep Saini
(74) *Attorney, Agent, or Firm* — Tarolli, Sundheim, Covell & Tummino L.L.P.

(57) ABSTRACT

A forensic verification system (900) extracts a print signature via a print signature extractor (910) from a captured image of a printed halftone. The system (900) utilizes a comparator (920) to compare the print signature to a reference signature stored in a registry to determine differences between the print signature and the reference signature. The system (900) utilizes a forensic analyzer (930) to perform a forensic analysis on the signatures based on the comparison to authenticate the printed halftone.

11 Claims, 9 Drawing Sheets

(56) References Cited

U.S. PATENT DOCUMENTS

| | | |
|---|---|---|
| 2004/0101158 A1* | 5/2004 | Butler ............................ 382/100 |
| 2007/0188793 A1 | 8/2007 | Wakai |
| 2010/0158377 A1 | 6/2010 | Cowburn et al. |
| 2010/0246980 A1 | 9/2010 | Tong |
| 2012/0070030 A1* | 3/2012 | Ulichney et al. .............. 382/100 |

OTHER PUBLICATIONS

Oliver, J.F et al, "Use of Signature Analysis to Discriminate Digital Printing Technologies", Sep. 2002.

* cited by examiner

FORENSIC VERIFICATION FROM HALFTONE IMAGES

BACKGROUND

In environments where sensitive or confidential documents are handled, such as in financial institutions, it is often desirable to have the ability to trace who printed a document as well as when and where it was printed. For example, it may be desirable to know if a check or other financial instrument was printed from an authorized source (e.g., printer, location, and so forth) as opposed to being a fraudulent copy of the respective instrument. Electronic means such as bar coding have been applied to documents in an attempt to authenticate the legitimacy of the documents. Bar coding, for example, can unacceptably alter the appearance of the documents by embedding superfluous information such as the bar code image into the document. Bar codes can be easily copied and since barcode reading and generating software is ubiquitous, barcode counterfeiting is readily automatable.

DETAILED DESCRIPTION

Figure 1:
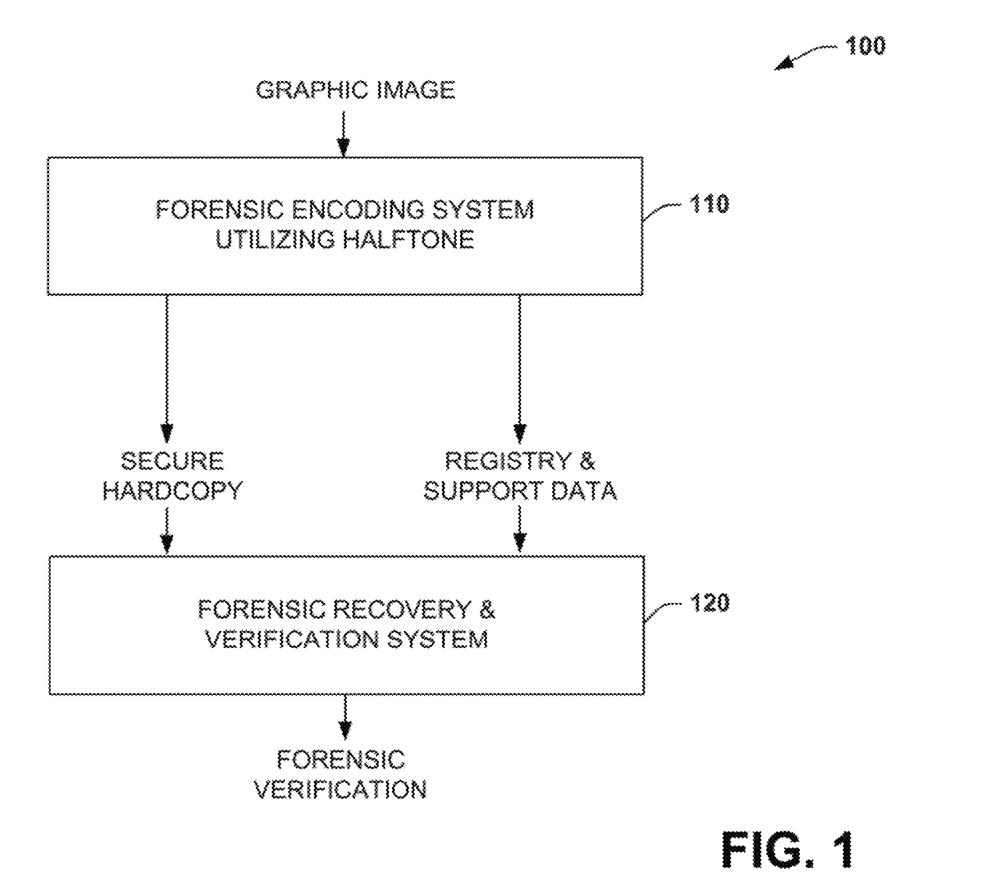
FIG. 1 illustrates an example system for performing forensic verification of printed documents utilizing halftone images.

FIG. 1 illustrates an example system for performing forensic verification of printed documents utilizing halftone images. The system 100 includes a forensic encoding system 110 (also referred to as the encoding system) that utilizes information from halftones to encode forensic information. As shown, the forensic encoding system 110 receives a graphic image for encoding forensic information. Output from the encoding system 110 includes a secure hardcopy and registry and support data that are employed by a forensic recovery and verification system 120 to perform forensic verification of printed documents. As used herein, forensic analysis and verification provide the means to authenticate a printed document. This includes the ability to prove statistically whether or not a document was printed from an authorized source or is an unauthorized copy.

As an example of analysis and verification, electronic tickets and vouchers may be distributed from a ticket agency having an agency printer generate the tickets for their respective customers. The tickets printed from the agency printer are considered authorized and valid upon redemption. If someone were to print additional originals (electronic copies) or copy the ticket utilizing a scanner and subsequent printer, such printing would be unauthorized and fraudulent. The system 100 provides encoding and decoding of covert information placed within portions of printed documents to enable authentication. "Covert" implies that the authentication information is encoded as part of the printed image and thus undetectable by the naked eye. As can be appreciated, the authentication processes described herein can be applied to any type of printed document where it is desirable to verify that a given document corresponds to a unique physical instantiation. This functionality could also be used for applications that include but are not limited to cases where it is desirable to trace the origins of the equipment, organization, or people, that generated the document (e.g., prove whether or not the document was generated by a particular printer, by an authorized printer, or conversely whether document was printed/copied from an unauthorized printing source). A high-density printed mark is often preferable as it may incorporate a primary payload (unique bit stream) and a secondary payload (e.g., digital signature of the primary payload).

A known printed halftone image can be used for forensic inspection. A halftone image can be a visually similar version of an original continuous-tone image where pixels of limited amplitude levels, usually only 2 levels, are suitably arranged. Halftoning algorithms can achieve this by arranging the limited amplitude pixels in a dispersed, clustered, or combination of dispersed and clustered dots. When a sufficiently high resolution image (e.g., 7200 DPI) of the printed halftone is captured, an image registration process described below aligns the region covered by the halftone for analysis in order that a unique print signature can be generated. The print signature is considered unique since it incorporates those features of the print that result from the stochastic nature of the print process and its interaction with the underlying substrate upon which the print is printed. The print signature can then be compared between multiple captures of the same document in order to prove that the physical document is in fact the same as one analyzed previously. The method is fully supportive of variable-data printing, for example, when the halftone images are unique to each printed item. The signatures can be generated without knowing the content per se, but utilizing the rudimentary structure/constraints of the halftoned mark, for example.

Halftone based forensic inspection allows the analysis of printed image data for forensic comparison. That is, a comparison to determine if the document under investigation is the same unique document that was previously printed. In this manner, the printed halftone image can be used as a security mechanism preventing/identifying the counterfeit and/or copy of documents, labels and product packaging, for example. In order to achieve this task, a repository can be built containing images of the printed halftone and/or forensic information extracted from them. When the repository has been constructed, individual captures of the same printed halftone can be compared to the version stored therein (e.g., using associated unique serialization information to index the repository). In one example, an inexpensive high resolution contact imaging device, referred to as a DrCID (Dyson relay CMOS Imaging Device) can image printed materials at the appropriate resolution for forensic analysis.

Previous methods use the analysis of the random nature of the printed outline of easily identifiable solid forensic marks such as dots, characters or other printed glyphs to provide the print signature. The methods described herein provide a more general and efficient technique as it is applicable to any printed material and does not rely on identifying a solid outline that can easily be modeled (explicitly or implicit within the print signature extraction process). Such halftone images could depict photographically acquired images, graphical content, or more specifically company logos or other printed patterns, for example.

The system 100 can also be employed to authenticate the association of two or more items, for example (e.g., a label or medallion with a serialized document on which the label/medallion is affixed). Since gray scale printing processes are inherently bi-tonal, halftoning processes can be utilized for continuous-tone graphics or images by producing the visual illusion of continuous tone though the arrangement of black and white pixels. One type of halftoning can be based on a clustered-dot technique, where gray levels are rendered with arrays of black and white clusters of pixels where the clusters are of varying size and shape. In one example, halftones may not change from print-to-print and in other examples each version of a halftone in each single printed page can be different. For example, a halftone can be generated that varies with the printing device, ink/printed material used, document author(s), user requesting the print, timestamp, security clearance, network state, or some combination of these and/or possibly other factors.

To authenticate a printed document, a captured image to be analyzed can be processed by the forensic recovery and verification system 120. The captured image (e.g., snapshot image of printed document) should be of sufficient resolution to enable the halftone interior analysis techniques described herein. For example, a high resolution camera or scanner such as the DrCID described above (e.g., capable of acquiring an image at a resolution of 7200 dots per inch (DPI)) can be employed to capture printed media and generate the image to be analyzed. The forensic recovery and verification system 120 can generate a print signature that can be derived from the registered halftone. The forensic recovery and verification system 120 compares the recovered print signature to the reference print signature stored in the registry.

An authentication event can be handled by the forensic recovery and verification system 120 based on a comparison between the reference signature from the registry and the print signature derived from the captured image. This can include a statistical analysis (e.g., compare print signature differences to a statistical threshold, where the threshold is a designated level of statistical confidence to grant authentication). The authentication can include other analysis such as a machine learning or artificial neural network analysis where trained classifiers analyze the respective print signatures in view of the retrieved reference signatures from the registry. It is noted that the forensic analysis and verification procedures described herein can be applied to any type of printed document such as can be provided by printers or other devices such as copiers, fax machines, and multi-function print devices.

For purposes of simplification of explanation, in the present example, various components of the system 100, such as the encoding system 110 and the forensic recovery and verification system 120, are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., a CPU, an application specific integrated circuit), or as a combination of both. In other examples, the components could be distributed among remote devices across a network, for example. The executable instructions of the encoding system 110, the verification system 120 and other functions disclosed herein can be provided as a non-transitory computer readable medium having the computer executable instructions stored thereon.

Figure 2:
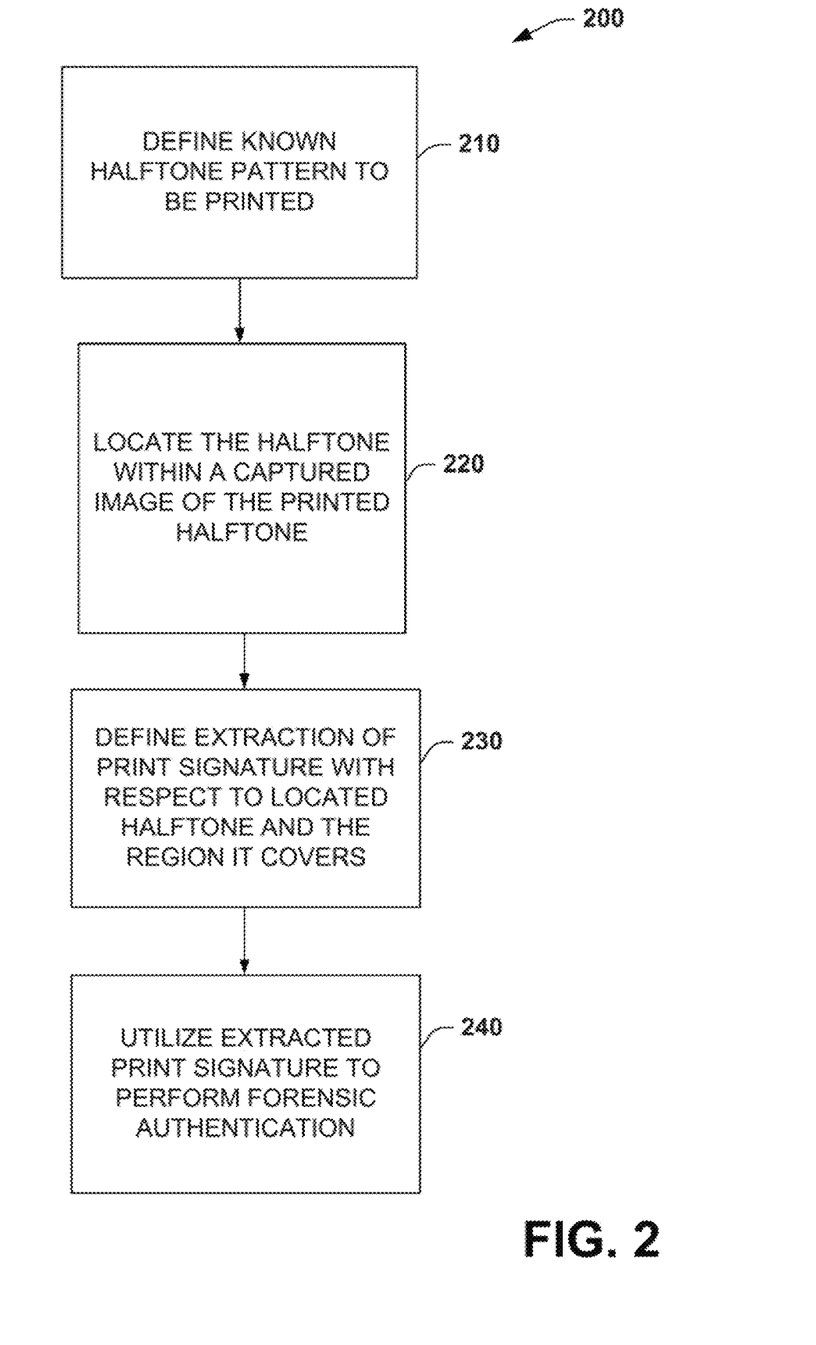
FIG. 2 illustrates an example method for performing forensic verification of printed media utilizing halftones to generate and analyze print signatures.

In view of the foregoing structural and functional features described above, an example method will be better appreciated with reference to FIG. 2. While, for purposes of simplicity of explanation, the method is shown and described as executing serially, it is to be understood and appreciated that the method is not limited by the illustrated order, as parts of the method could occur in different orders and/or concurrently from that shown and described herein. Such a method can be executed by a processor and associated equipment, for example. Before proceeding, it is noted that the method 200 will be described in conjunction with various images depicted in FIGS. 3-8.

FIG. 2 illustrates an example method 200 utilized when performing forensic encoding and forensic verification of printed media utilizing halftones to generate and analyze print signatures. In order to extract a print signature from a printed halftone image, the method 200 defines a known halftone pattern to be printed at 210. The method 200 then applies various analytical techniques described below to accurately locate the halftone (or a portion of it within a captured image of the printed halftone at 220. The method 200 then defines an extraction of the print signature with respect to the located halftone and the region it covers (e.g., via print signature extractor 910 of FIG. 9). At 240, the method 200 employs the extracted print signature to perform forensic authentication as previously described (e.g., via forensic analyzer 930 of FIG. 9). The method 200 can utilize the known halftone to accurately register a region of the image to be analyzed in order to extract the print signature. Halftone areas are generally large enough to accommodate multiple approaches to signature extraction across the height and width of the halftoned area. Multiple approaches can be applied to signature determination, including a mosaic of signatures for substantially large printed areas, affording a second layer of security in addition to the extraction itself as the primary security vehicle.

FIGS. 3-8 demonstrate some examples of forensic verification that can be implemented utilizing print signatures. Such a description will be provided in terms of specific examples such as a scenic image as an example halftone image; however, any portion of the image can be employed. As noted previously, the halftone itself can be employed by the halftone interior analysis techniques such as disclosed herein.

Figure 3:
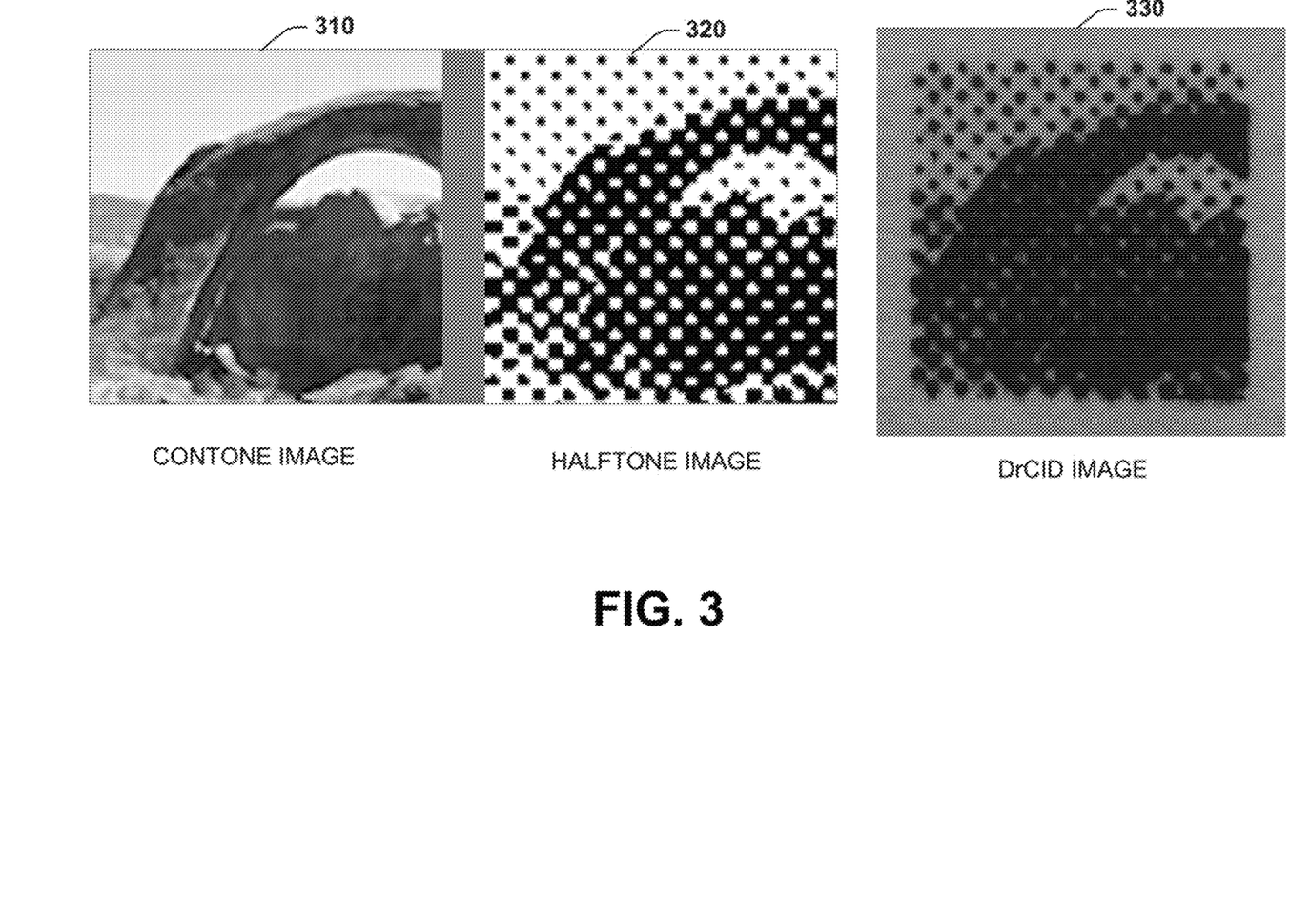
FIGS. 3-8 illustrate example processing images for performing forensic verification and authentication.
Figure 4:
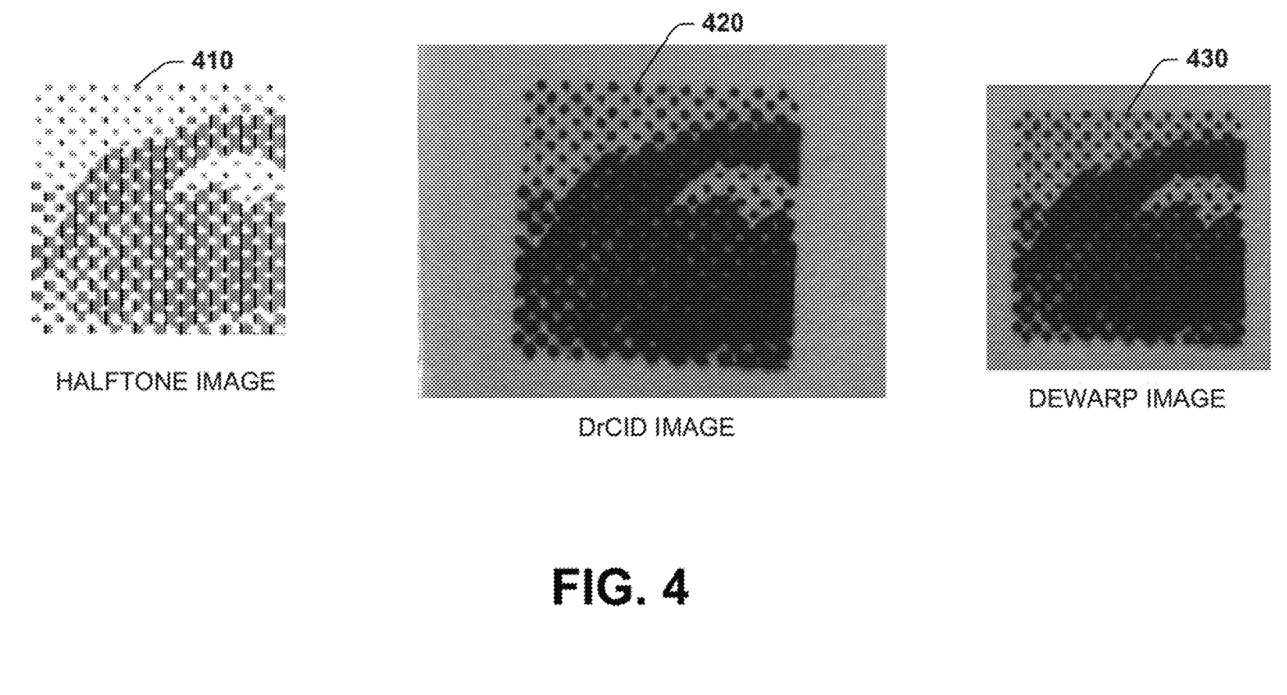
Figure 5:
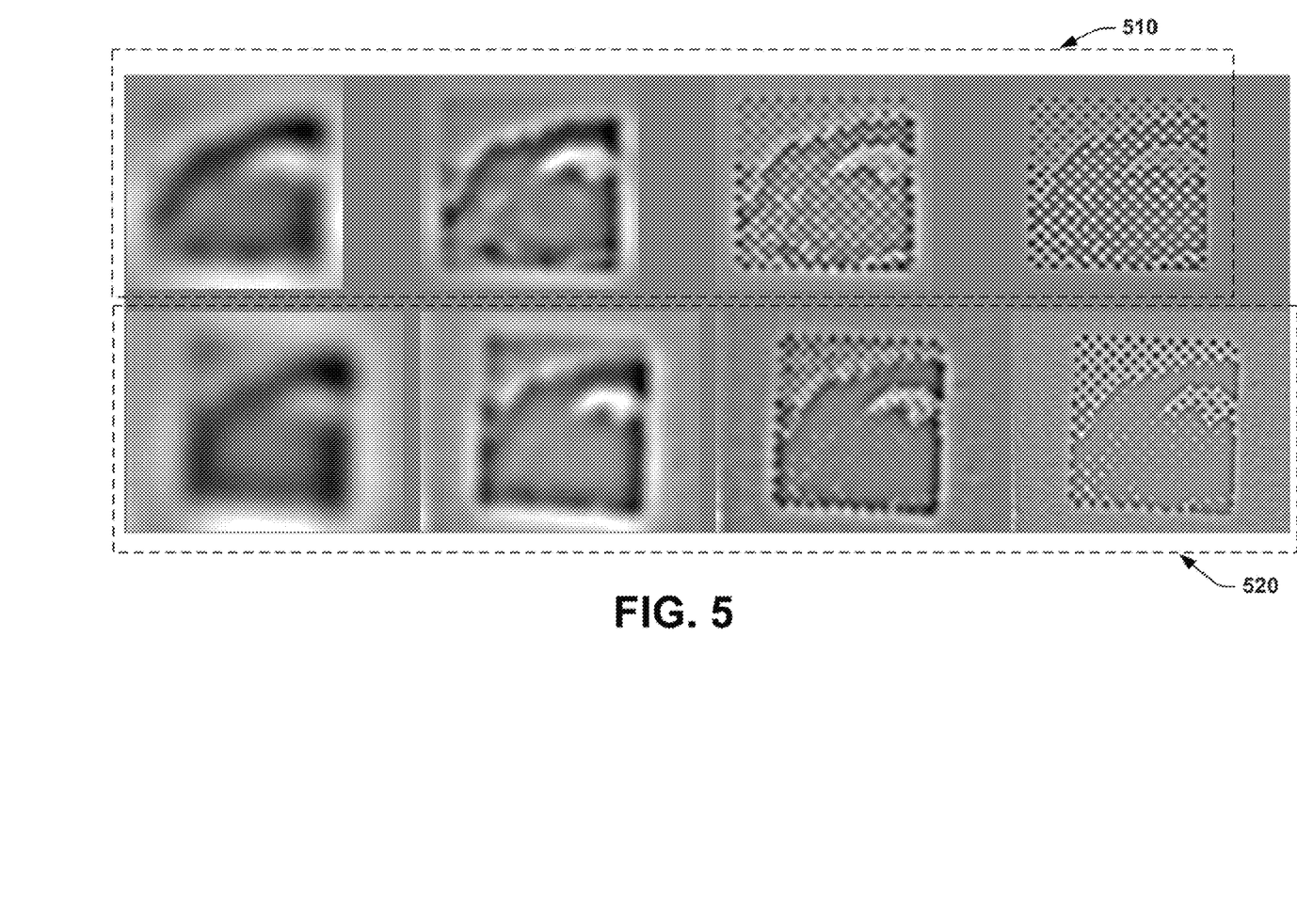
Figure 6:
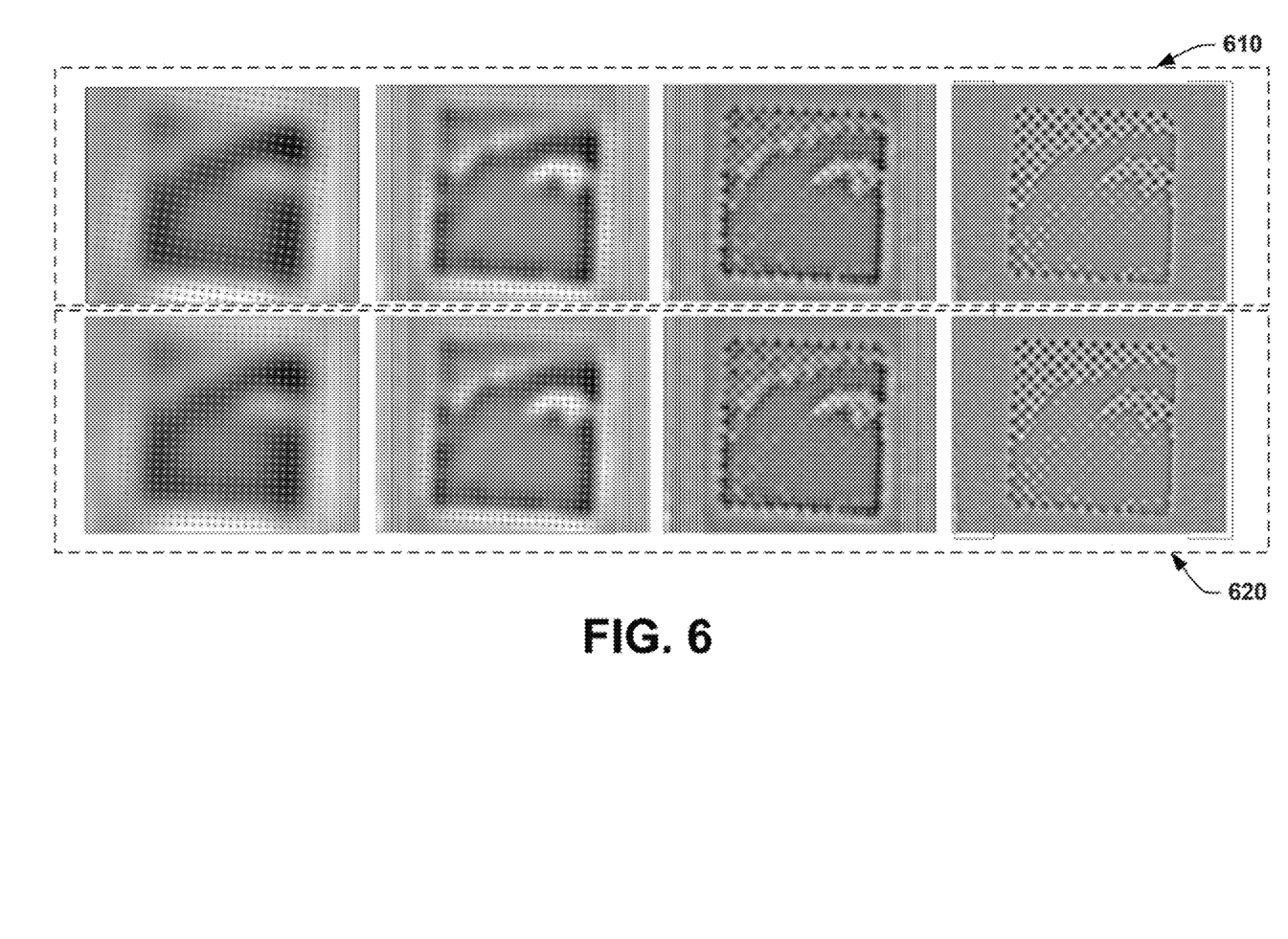

An example image, halftoning, and capture process is depicted in FIG. 3, where a contone example is shown at 310, a halftone example is shown at 320, and a DrCID image is shown at 330. An example registration process is illustrated in FIG. 4, where a halftone example is shown at 410, a DrCID example of the halftone 410 is shown at 420, and a dewarped DrCID image is shown at 430. This registration can be image based to locate a suitable allowed transformation of the halftone into the captured image or alternatively could utilize fiducial marks within the halftone pattern to identify the transformation. The former technique is more general as it should not limit the halftone pattern in substantially any manner.

In one example, the printed halftone pattern can be small enough to be captured in its entirety using a high resolution DrCID (which has a field of view of about 6.5×5 mm). However, it is possible using similar techniques to extract a partial signature from within a larger halftone image. The halftone in the image can be located using a form of multi-scale image alignment as shown in a series of images at 510 and 520 depicted FIG. 5. For example, an iterative update can be performed where the multi-scale images approximates a Laplacian Pyramid. At each scale, the level in the pyramid can be determined from the difference of Gaussians (DoG) which is the subtraction of two Gaussian smoothed images where the standard deviation of the Gaussian doubles in size between the two images. This provides what is essentially a band pass filter of the original image which can be further normalized by scaling the resulting intensities to cause their standard deviation to be unity. This allows the method to overcome the qualitative difference between the highly stylized digital halftone image 510 as compared to the printed and captured version that results from DrCID 520.

The scale relating the original halftone (which is printed at 600 dpi) and the version captured by DrCID is known in advance to be approximately 12× (times). The approximate location of the halftone is determined from the image moments of the broadest band-pass filter of the halftone and captured images. The result of image alignment can be an affine transform that relates the original halftone and the DrCID captured image such as shown in a series of images at 610 and 620 depicted in FIG. 6. At each scale the location of the halftone image can be refined from its initial location at 610 to its final location at 620 using a gradient decent optimization technique that minimizes the difference between the respective band-pass filtered images. When the final transform at the highest level of detail has been recovered it can be used to warp the captured image to produce an aligned version of the captured halftone.

In an alternative example, rather than using the stylized digital halftone image as the basis for image alignment, it is possible to recover a general image-based model. While, at the scale of DrCID, each individual print of the halftone pattern can be very different (due to the vagaries of the print process). However, by combining and averaging a suitable large sample (captured from multiple printers) it is possible to produce an idealized print model. This process is often referred to as image congealing. In this example, it is sufficient to select one image as an initial seed and use the image alignment technique described above to align all other images to it. These are then combined and averaged to create a new seed and the process can be repeated. The final image model is then transformed to the digital version of the halftone either using the automatic image alignment process once more or identifying corresponding points by hand.

It is noted that the goal of image alignment is not necessarily to accurately align all images of all prints of the halftone image. Instead, it is utilized to accurately align different images of the same print in order that they or their extracted print signatures can be compared. When the digital halftone (or its image based model) has been aligned in a specific image captured by DrCID or other suitable image capture device, the method 200 provides a frame of reference with respect to which consistent regions of the halftone image can be identified, extracted and processed to generate a print signature. This signature could correspond to the warped image of the captured print in its entirety. However this may be a cumbersome solution (of the order of 3 MB of data that is transmitted and compared against versions in a remote database).

In another example, an area code processor is defined which attempts to characterize the local variation of the print process. The area code process first divides the image into N×N equally sized sub-regions. For each sub-region, compute the variance of the registered image. A coding can then be obtained by using the mean (or medium) variance over all sub regions as a unit value. This is referred to as Area Variance Coding (AVC) and can be defined as an $N^2$-position string:

$$AVC_j = \|V_j/V_{mean}\| \qquad \text{Equation 1}$$

where $V_j$ is the variance of sub region j, $V_{mean}$ is the average value of that variance over all sub regions and $\|.\|$ is a rounding function.

The distance function (DF), for comparing the AVC's of any two halftone signatures, can be defined as:

$$DF = \sum_j \min(|AVC_1(j) - AVC_2(j)|, T_{max}) \qquad \text{Equation 2}$$

where $T_{max}$ is a threshold that can be utilized to improve robustness.

The DF can be considered a form of modified Hamming Distance where the expected value of AVC(*) is 1 at each digit due to the normalization process described. For example, a pair of AVCs ($N^2$=49) extracted from Dr CID data for the same printed halftone and their absolute difference are:

AVC1=1101111120110111121121112111111101121211-2111101011

AVC2=1111111121010010121121112111121101111111-2111101121

DIFF=0010000001100101000000000000010000010100-0000000110 for which the DF is 10 (or 0.204 when normalized by $N^2$).

It is possible to pre-process the registered image in order to improve the discriminating power of this coding scheme. If an image-based model is available, it can be subtracted from the registered version to highlight the differences to an idealized print thus removing some of the signal from the individual AVCs. Additionally or alternatively, it may be useful to smooth the result of image differencing, such as with a Gaussian filter, to reduce the contribution of image noise to the coding.

Figure 7:
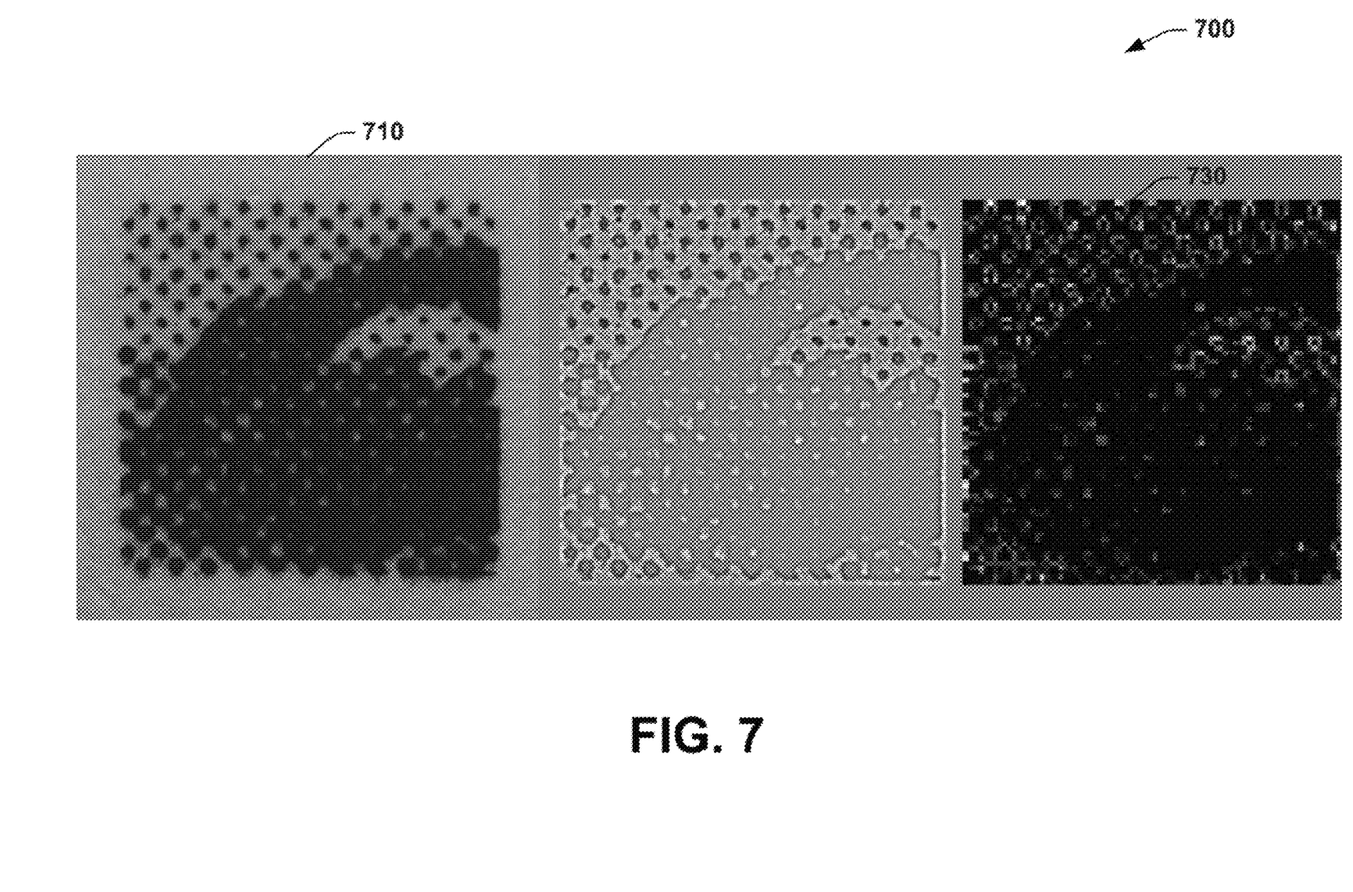
Figure 8:
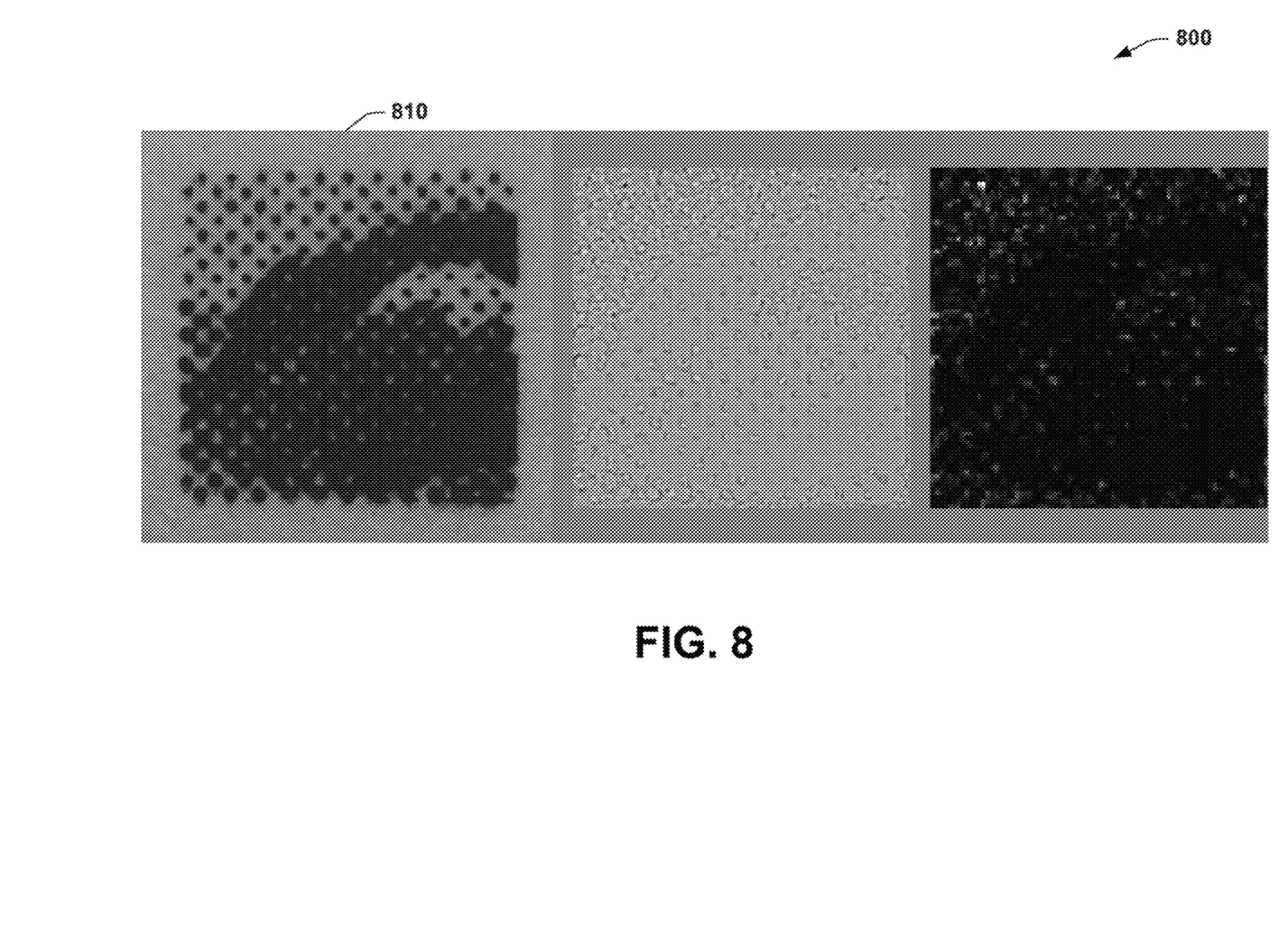

In another example, a DoG band-pass filter can be applied as shown in a series of images at 700 of FIG. 7 to achieve a similar effect when the model is not available. An image 710 shows an original warped registered image of a halftone which is band-pass filtered at 720 and from which AVCs are recovered and shown pictorially at 730. It is noted that the forensic authentication implies that the probability of either failing to verify copies of the same document or erroneously matching different documents (e.g., false negatives and false positives respectively) is very low (e.g., much less than one chance in a billion or other threshold value).

The area code processing methods described herein can change the main processing parameters (e.g., sampling frequency and scale parameters of band pass filters). However, this may still utilize a large AVC to provide a satisfactory level of forensic authentication. In another example, random projection can be employed, where a set of L linear random basis functions of length $N^2$ can be used to project the original area codes to a lower dimensional space (before or after quantization), works well in some instances. It is also possible to combine meta-groups of area-codes using weighted sums. This provides an alternative process to generate a shorter area code from a longer one. For example, one possible method would be to group the N×N area codes into M×M groups, where each group has n×n entries. The $n^2$ entries can be weighted and summed to provide the meta-code, which can be performed either before or after quantization). For example, weighting concentric regions could provide a symmetry code, but other patterns of weights are also possible. It is also possible that the regions covered by area codes overlap rather than being contiguous. Still yet other processing of images can include digital subtraction of bandpass filtered images to separate random detail from the subject area code images as shown in a series images at 800 of FIG. 8. An image 810 shows an original warped registered image of a halftone which is band-pass filtered and has a band-pass filtered version of the expected halftone image subtracted from it at 820 and from which AVCs are recovered and shown pictorially at 830.

It is noted that the encoding and decoding methods described herein can be covert within the printed document. Thus, no special printing, labeling, marking or reading equipment is required to perform forensic authentication. This provides a forensic identification of any halftoned area, irrespective of its content and can support both long run (static) and variable data printing. Such methods can be targeted to a portion of an image or the size optimized for bandwidth, processing, and/or other system constraints.

Figure 9:
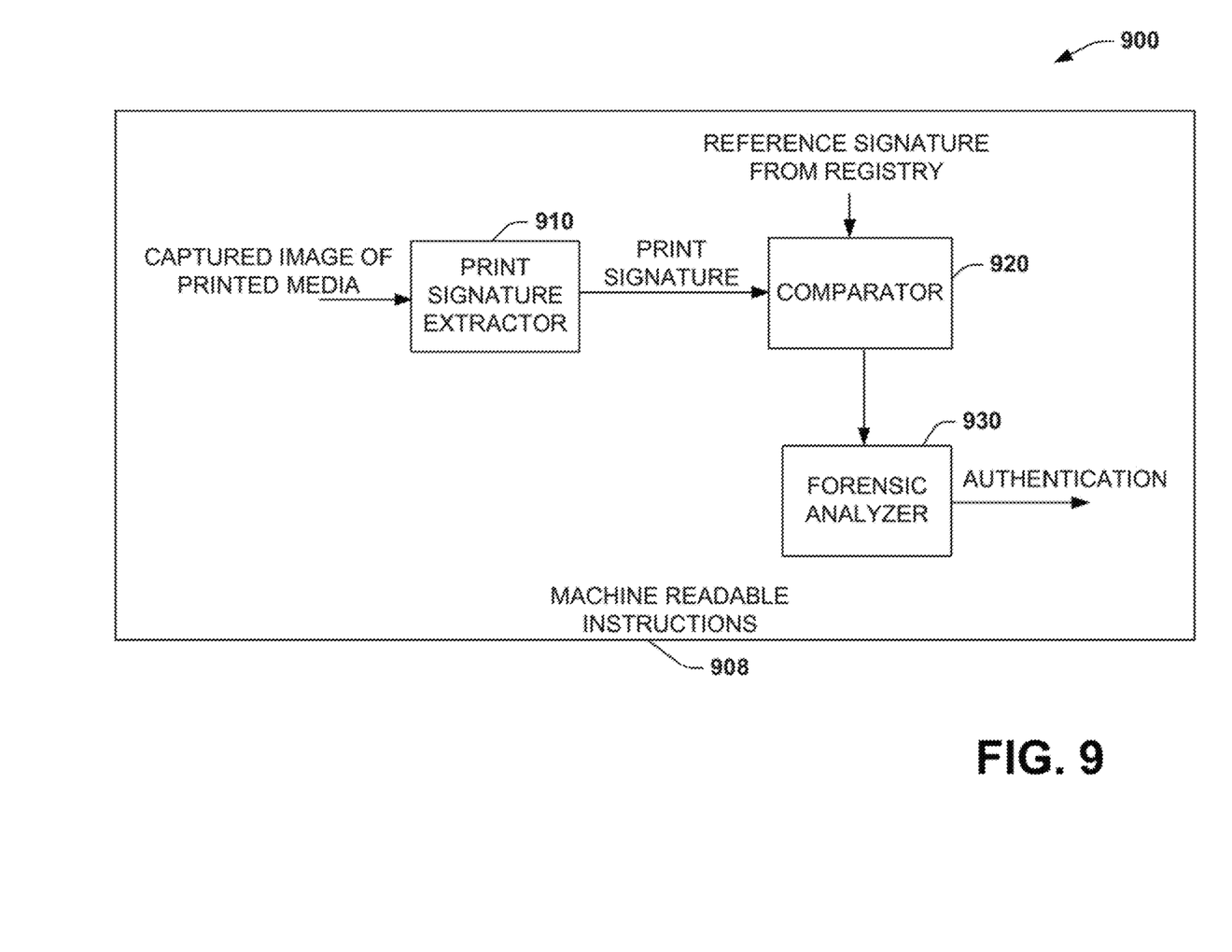
FIG. 9 illustrates an example of a forensic analysis system.

FIG. 9 illustrates an example of a forensic analysis system 900. The system 900 includes machine readable instructions 908 that enable a forensic analysis and verification of printed documents. The system 900 includes a print signature extractor 910 to extract a print signature from a halftone of an image of printed media. A comparator 920 compares the print signature to a reference signature stored in a registry to determine differences between the print signature and the reference signature. A forensic analyzer 930 performs a forensic-level statistical image analysis on the print signature and the reference signature based on the comparison to authenticate the printed media.

While the registry can be stored in a conventional computing infrastructure such as in a database on a server or in the cloud, it can also be included in or attached to the document itself. For example, the reference signature could be printed on the document in the form of a barcode or contained within an RFID tag connected to the document. A similar approach can also be used in cases where there is a mosaic of signatures extracted.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium comprising computer executable instructions that when executed cause a processor to:
   extract a print signature from a captured image of a printed document by registering a location of a halftone in the captured image according to a transformation of an expected halftone pattern;
   authenticate the printed signature based on a forensic-level statistical image analysis,
   wherein the forensic-level statistical analysis comprises:
      accessing a reference signature stored in a registry that is included in the captured image, wherein the registry is located within the document or attached to the document;
      comparing the print signature to the reference signature to determine differences between the print signature and the reference signature; and
      verifying that the print signature is authentic based on the comparison.

2. The non-transitory computer readable medium of claim 1, wherein the expected halftone pattern is a digital representation of the halftone.

3. The non-transitory computer readable medium of claim 1, wherein the expected halftone pattern is derived from one or more captured images of printed halftones from one or more printers.

4. The non-transitory computer readable medium of claim 3, further comprising instructions to perform image congealing to facilitate image alignment.

5. The non-transitory computer readable medium of claim 1, wherein the halftone is registered via multi-scale image alignment of images that approximate a Laplacian Pyramid.

6. The non-transitory computer readable medium of claim 5, wherein a level in the Laplacian Pyramid is determined by a difference of Gaussians.

7. The non-transitory computer readable medium of claim 1, further comprising a subdivide area processor to process the captured image of the printed halftone into halftone segments and to recover from each segment a sub-code, the sub-code recovered from each segment being combined to produce the print signature.

8. The non-transitory computer readable medium of claim 1, further comprising:
   a subdivide area processor to process the captured image of the printed halftone into halftone segments; and
   an area code processor to compute a variance of the halftone segments and derive a normalized code for each segment from a rounded quotient of each segment with respect to a mean variance to produce the print signature.

9. The non-transitory computer readable medium of claim 8, further comprising a transformation to a smaller dimensional space.

10. A method, comprising:
    defining, by a system comprising a processing unit, a predetermined halftone pattern for a printed document;
    locating, by the system, a verification halftone pattern from the printed document utilizing the predetermined halftone; and
    deriving, by the system, a print signature from the verification halftone pattern to facilitate forensic analysis, wherein the forensic analysis comprises:
       accessing a reference signature stored in a registry that is included in the printed document;
       comparing the print signature to the reference signature to determine differences between the print signature and the reference signature; and
       verifying that the print signature is authentic.

11. A system comprising:
    a memory for storing computer executable instructions; and
    a processing unit for accessing the memory and executing the computer executable instructions, the computer executable instructions comprising:
       a preprocessor to generate an output from a captured image of printed media;
       a subdivide area processor to segment the output in preparation of further image processing of the captured image of printed media;
       an area code generator to process the segmented output from the subdivide area processor and to recover a print signature from a halftone; and
       a forensic verification system to authenticate the printed media by comparing the recovered print signature with a reference signature stored in a print signature registry that is included in the printed media.

* * * * *